Jan. 20, 1959 W. R. AIKEN 2,870,361

ELECTRONIC DEVICE

Filed Oct. 27, 1955 6 Sheets-Sheet 1

INVENTOR.
WILLIAM ROSS AIKEN
BY James E. Toomey
Atty.

Jan. 20, 1959 W. R. AIKEN 2,870,361

ELECTRONIC DEVICE

Filed Oct. 27, 1955 6 Sheets-Sheet 2

INVENTOR.
WILLIAM ROSS AIKEN
BY James E. Toomey
Atty.

Jan. 20, 1959 W. R. AIKEN 2,870,361

ELECTRONIC DEVICE

Filed Oct. 27, 1955 6 Sheets-Sheet 3

INVENTOR.
WILLIAM ROSS AIKEN
BY James E. Toomey
Atty.

INVENTOR.
WILLIAM ROSS AIKEN
BY James E. Toomey
Atty.

Jan. 20, 1959 W. R. AIKEN 2,870,361

ELECTRONIC DEVICE

Filed Oct. 27, 1955 6 Sheets-Sheet 5

INVENTOR.
WILLIAM ROSS AIKEN
BY James E. Toomey
Atty.

INVENTOR.
WILLIAM ROSS AIKEN
BY James E. Toomey
Atty.

United States Patent Office 2,870,361

Patented Jan. 20, 1959

2,870,361

ELECTRONIC DEVICE

William R. Aiken, Los Altos, Calif., assignor, by mesne assignments, to Kaiser Industries Corporation, a corporation of Nevada Application October 27, 1955, Serial No. 543,082

10 Claims. (Cl. 313—77)

The invention relates to an electron discharge device and more particularly to a tube of the cathode ray type for reproducing symbols in luminous form.

Attendant with the development of electronic applications in various of the communications field, there has developed the need for high speed printing and recording devices which are capable of operating directly from data in coded form. Electromechanical devices are manifestly inadequate to function satisfactorily at very high speeds. However, electronic apparatus is adaptable for such high speed operation.

The instant tube which is of the image or symbol selection and display type is capable of reproducing symbols in luminous form which may then be recorded photographically. The input control signals may come from many of the usual control sources, preferably in a sequential pulse code. One of the many different manners the coded information or messages may be fed to the tube is by means of a perforated paper tape or magnetic tape. Manifestly, the same information could likewise be impressed on individual cards such as those employed in connection with existing large automatic business machines. In other environments, the control signals may originate from other sources, as for example, the instant tube has application in the field of aircraft navigational equipment of the radar type wherein the control signals are functions of the transmitted waves which have been reflected by an object in searching beam pattern.

In one embodiment, the tube comprises an evacuated elongate envelope which functions to house the internal operational components of the tube. The internal components include an electron sensitive target, an elongate cathode adapted to deliver a single sheet of electrons, an accelerator electrode extending in substantially coextensive relation with the cathode, said accelerating electrode having perforations formed therein representing various symbols which are to be displayed on the target, and a set of deflection elements adapted to selectively deflect a portion of the beam into impingement with the target.

In operation, the electrons emitted from the cathode are caused to be passed through the apertures or perforations formed in the accelerating electrode simultaneously. The deflection elements are all maintained at a potential value substantially equal to the potential impressed on the perforated accelerating electrodes establishing a field free region.

The coded input signals are then selectively applied to selective ones of the set of deflection elements in such a fashion that the portion of the electron beam passing through the perforation of the desired symbol to be displayed is deflected through the field-free region toward and into impingement with the target. Electron impingement on the target causes excitation of the target material in the form of light representing the shape or configuration of the selected symbol.

A more complete understanding of the invention and its numerous advantages will be readily manifest to those skilled in the art from a reading of the following description taken in connection with the accompanying drawings, in which:

Figure 1 is a side view partially in section of a cathode ray tube employing the features of the instant invention, Figure 2 is a sectional view of the cathode ray tube taken along line 2—2 of Figure 1, Figure 3 is an enlarged view of the perforated matrix electrode shown in Figures 1 and 2, Figure 4 is an isometric view of the perforated matrix electrode shown in Figure 3 and a portion of the individual associated deflection electrodes showing the colocation of the elements with respect to one another, Figgure 5 illustrates one system in which a cathode ray tube incorporating the features of the instant invention may be satisfactorily employed.

Figure 2:
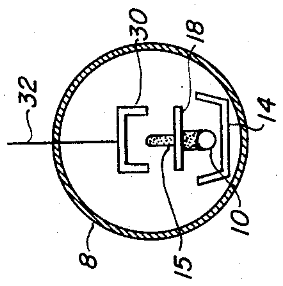
Figure 1:
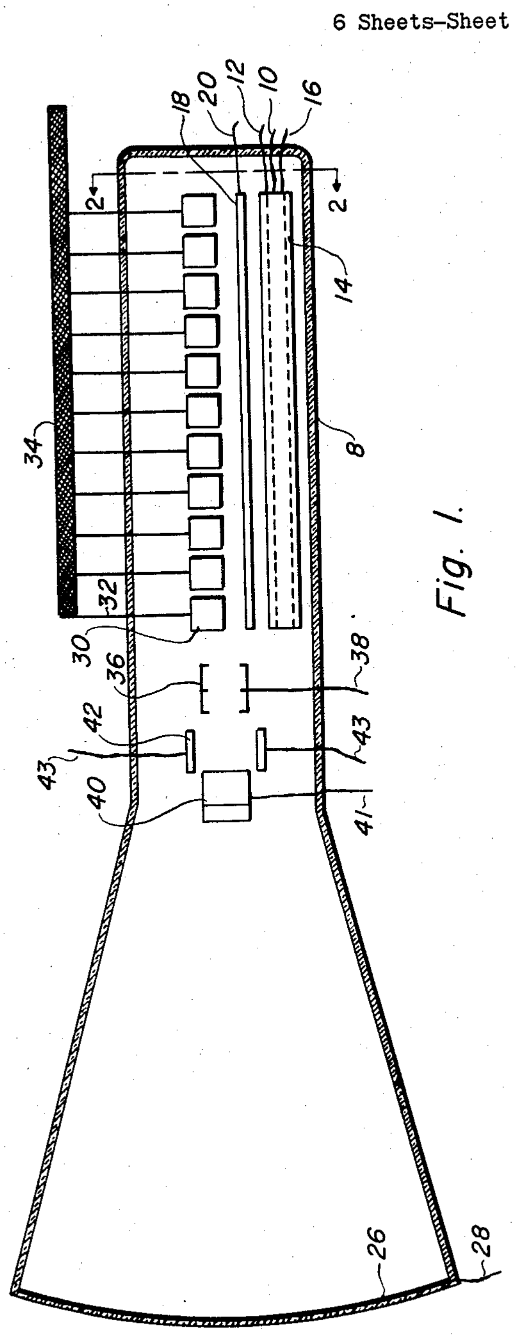

In accordance with one embodiment of the invention, as shown in Figures 1 and 2, there is provided an evacuated envelope 8 which may be of the conventional type employed in connection with the conventional cathode ray tubes. However, it must be understood that the internal components of the instant invention may likewise advantageously be employed in connection with the Aiken type flat cathode ray tube. A complete disclosure of such a tube is shown and described in applicant's copending applications, Serial No. 355,965, filed May 19, 1953, now abandoned; and Serial No. 396,120 filed December 4, 1953, which issued as Patent No. 2,795,731 on June 11, 1957.

Disposed with the reduced neck portion of the envelope 8, there is an elongate cathode 10 connected to a suitable power supply through an electrical conductor 12. An electron beam forming electrode 14 is positioned relative to the cathode 10 in a manner so as to establish an electrostatic field in the region of the cathode 10. This electrostatic field functions to cause the electrons which are radially emitted from the cathode 10 to converge and form a sheet beam of electrons 15. It will be noted that the beam of electrons 15 which would be caused to be formed by the arrangement shown in Figures 1 and 2 will travel in a vertical plane. The beam forming electrode 14 is energized from a power supply situated outside of the envelope 8 through an electrical conductor 16.

Figure 3:
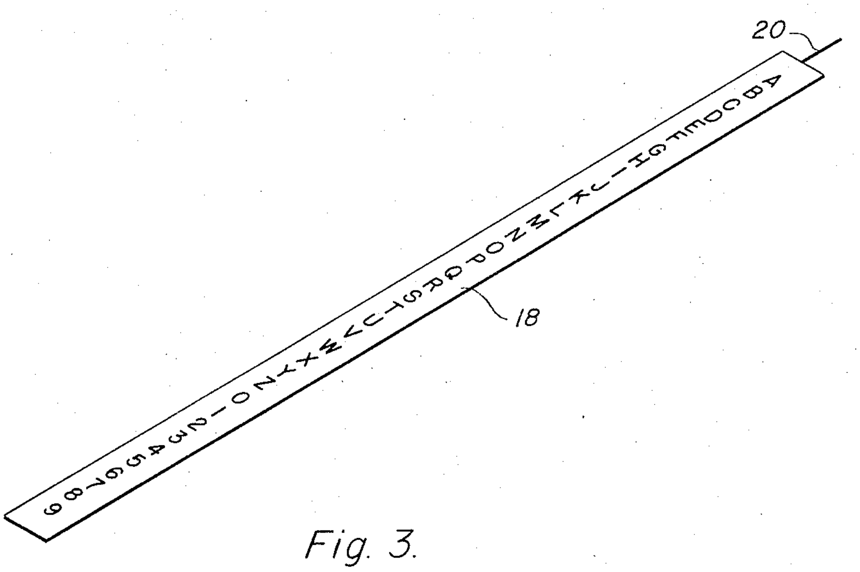

A perforated accelerating electrode 18 which is in the nature of a matrix, shown clearly in Figure 3 is disposed in spaced and coextensive relation with the cathode 10 and is suitably energized through an electrical conductor 20. The electrode 18 functions as a means to attract and thereby accelerate the electrons emitted from the cathode 10. Perforations are provided in the electrode 18 representing the symbols or characters which are to be displayed. The symbols or characters of the electrode 18 are of any desired type including the letters of the alphabet, numerals, punctuation marks, etc. The methods used in forming these symbols are varied and include such well known methods as stamping, chemical etching, and the like.

A set of deflection electrodes or elements 30 are spaced from and coextensive with the electrode 18 and are each connected separately to a selector circuit through electrical conductors 32. The conductors 32 may be conveniently cable means 34 to achieve a neat bundle of conductors.

It is proposed to employ an accelerator electrode 18 having sixty-four characters formed therein and a like number of deflection electrodes 30. Each character formed in the electrode 18 has an associated deflection electrode 30 and arranged in a slightly staggered relation with respect to one another. The reason for this staggered relationship will be explained in greater detail at a subsequent point in the description.

An accelerating anode 36 is provided within the reduced neck portion of the envelope 8 and connected to a regulated power supply through an electrical conductor 38.

A fluorescent target 26 is disposed adjacent the face of the tube 8 and is maintained at a desired potential through an electrical conductor 28 from any suitable source.

Horizontal and vertical deflection electrodes 40 and 42, respectively, are disposed at positions between the target 26 and the accelerating anode 36. Suitable electrical conductors 41 and 43 are employed to supply deflection control signals to the horizontal and vertical deflection electrodes 40 and 42, respectively.

In operation, the cathode 10 is supplied with current from a power supply through an electrical conductor 12. This current effectively heats the cathode 10 and causes electrons to be emitted from the surface thereof. It has been found that satisfactory results may be obtained by operating the cathode 10 at approximately 0 volts negative potential. The electrons emitted from the cathode 10 are formed into a sheet of electrons 15 by an electrostatic field established by energization of the beam forming electrode 14. Suitable focusing of the electrons may be effected by maintaining the electrode 14 at 5 volts potential negative with respect to the potential of the cathode 10. The sheet of electrons 15 assumes a vertical path and flows to the perforated accelerator electrode 18. Due to the fact that perforations are formed in the electrode 18, which is maintained in a satisfactory embodiment at 500 volts potential positive with respect to the cathode potential, certain of the electrons of the beam 15 are stopped by the electrode 18 while the other electrons are permitted to pass through the perforations. Accordingly, those electrons which have been emitted from the cathode 10 and pass through the perforated portions of the electrode 18 will assume the form or configuration of the perforations. More specifically, those electrons of the sheet of electrons 15 which pass through the perforation of the electrode 18 which is in the form of an A will have a corresponding cross-sectional configuration.

Figure 4:
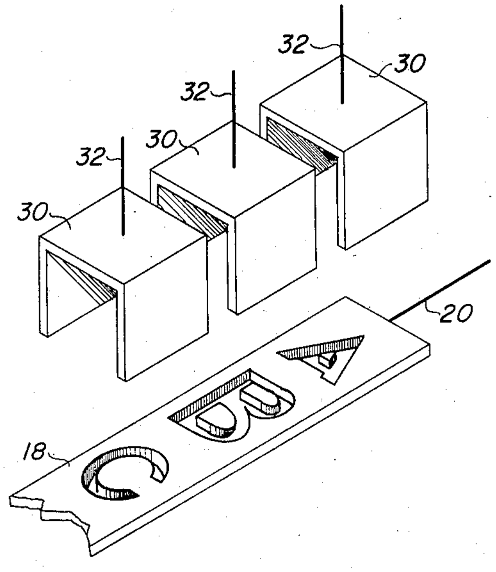

For purposes of simplification, it will be assumed that only the symbol "A" is desired to be displayed on the target 26 of the device. It will be further assumed that the symbol "A" is formed in the electrode 18 at a point thereon which is disposed near the terminal portion of the electrode 18 which is located in the reduced neck of the envelope 8 most removed from the target 26. In this instance, the associated deflection electrode 30 which is in staggered relation with the symbol "A" is selectively energized in such a manner as to lower the voltage thereon to a valve of approximately 0 volts potential with respect to the cathode potential causing the beam of electrons in the form of the symbol "A" to be deflected to travel a path toward the target 26. It must be understood that the relative dispositions of the perforations in the electrode 18 and their associated deflection electrodes 30 are such that the deflection electrodes 30 are spaced slightly more distant from the target 26 than their associated symbol perforations. This relative positioning is shown clearly in Figure 4. Such staggered relative disposition is desirable so that the electrostatic deflecting field established, upon selective energization of the deflection electrodes 30, will cause the electrons to be deflected or bent to travel toward the target 26. In another embodiment, not shown, the deflection electrodes 30 are disposed directly above their associated perforations in electrode 18 and the energization is such that a deflection electrode together with the next adjacent electrode is lowered in voltage to cause the proper deflection and travel of the beam of electrons.

Now, as the electron beam is deflected so as to travel along a path in the direction of the target, it must travel through a zone defined by the linear set of deflection electrodes 30 and the perforated electrode 18 coextensive with the deflection set. In order that no spurious electric fields will be present to adversely affect the electron beam travel through this zone, a field-free region is established by maintaining the electrode 18 and all the deflection electrodes 30 except the one which is acting to deflect the electrons passing through the desired perforation in the electrode 18 at a substantially constant potential, such as for example 500 volts potential positive with respect to the cathode potential.

The accelerating anode 36 is operative to accelerate the electron beam passing through the aforementioned field-free zone and also functions to focus the beam and thereby militate against any beam "blow-up" prior to impinging on the target 26. The anode 36 may be maintained at 650 volts potential positive with respect to the potential of the cathode 10.

The horizontal and vertical deflection electrodes 40 and 42, respectively, are operative to effectively position the electron beam on the target 26 in a manner well-known in the cathode ray tube art. Manifestly, when the electron beam impinges upon the target 26, the fluorescent material thereon becomes excited and gives off a luminescent visual display in the form of the selected symbol chosen on the perforated electrode 18.

Figure 5:
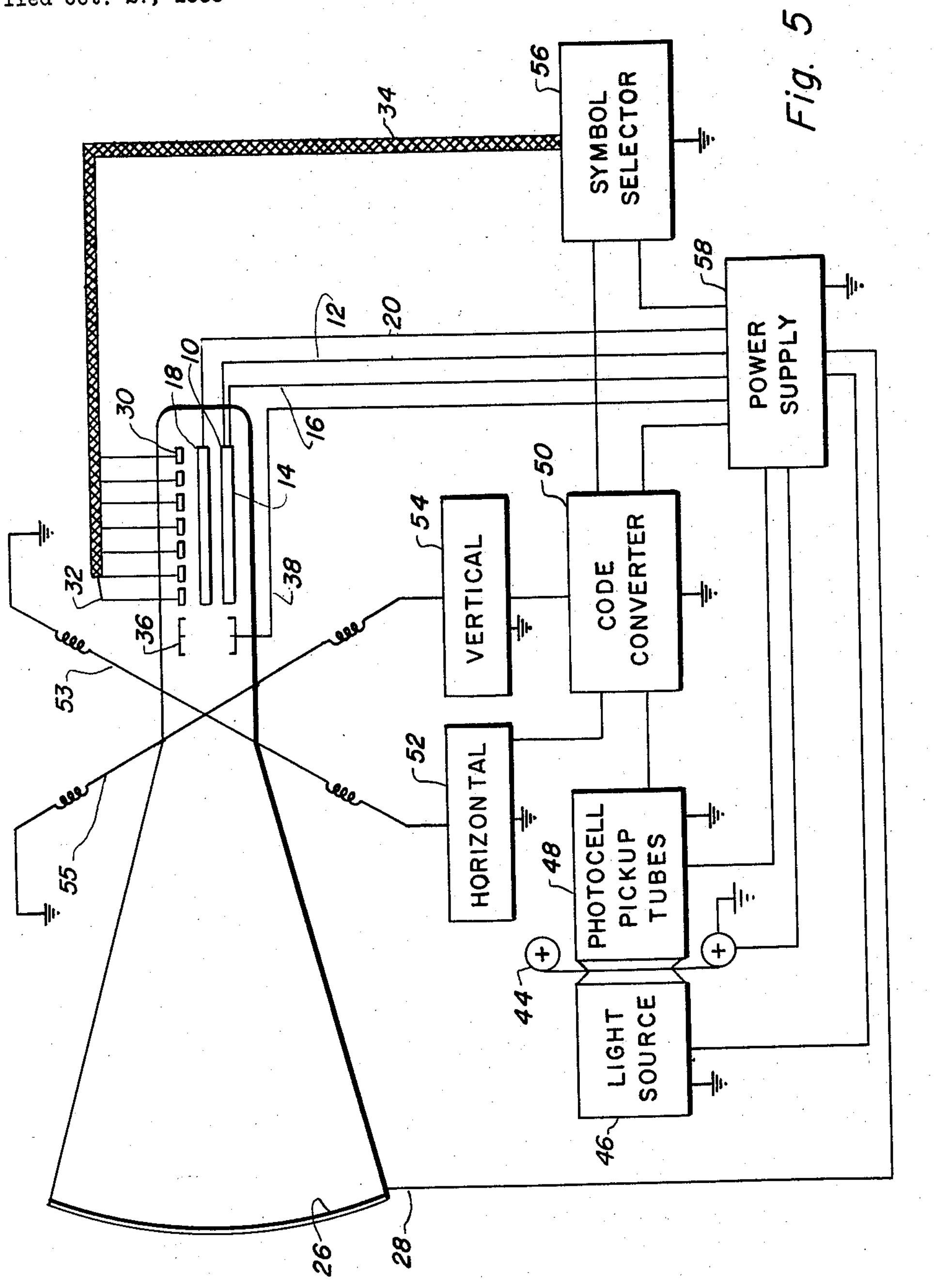

The operation of the instant device in a system simulates typesetting in the steps of selecting separate symbols one-by-one and reproducing them in a line or any other desired pattern on the fluorescent target 26. Figure 5 illustrates a system employing the instant device. In the system illustrated in Figure 5, the information or data to be visually displayed has been placed on a tape 44 in the form of perforations. The tape 44 is caused to pass between a light source 46 and an arrangement of photomultiplier tubes 48. The tape 44 is adapted to carry a plurality of perforations extending transversely of the tape in alignment with the photomultiplier tubes 48, so that when the tape is caused to be advanced between the light source and the phototube arrangement, the amount of light reaching the phototubes is determined by the number of perforations momentarily interposed between them and the light source. Each particular arrangement of perforations on the tape 44 represents a particular symbol and controls the amount of current delivered by the phototube arrangement passed through a code convertor 50 to a symbol selector 56. The code convertor 50 is adapted to separate the signals taken from the perforated tape 44 which are operative to position the electron beam on the face of the fluorescent target 26. By suitable synchronization between the electrical signal fed to the horizontal deflection generator 52 and the vertical deflection generator 54, which are both fed from the code convertor 50, the electromagnetic fields established by their associated horizontal and vertical deflection electromagnets 53 and 55, the electron beam may be effectively caused to scan the face of the target 26 to form either a single line, a complete raster, or a single dot.

The signal fed to the symbol selector 56 is operative to selectively decrease the voltage on any of the deflection elements 30 and thereby cause the beam passing through the associated aperture or perforation in the electrode 18 to be deflected and impinge on the fluorescent target 26 as hereinbefore described. It will be noted on Figure 5 that the power supply 58 provides the potentials impressed on the cathode 10, the beam forming electrode 14, the perforated accelerating electrode 18, and the accelerating anode 36 through their respective electrical conductors 12, 16, 20, and 38.

It will now be readily discernible that the invention has provided a novel tube of the cathode ray type which is capable of translating electrical impulses representing symbols of a message into visible replicas of the said symbols, which replicas may be utilized in numerous applications, such as for photographic recording and others too numerous to mention.

Figure 6:
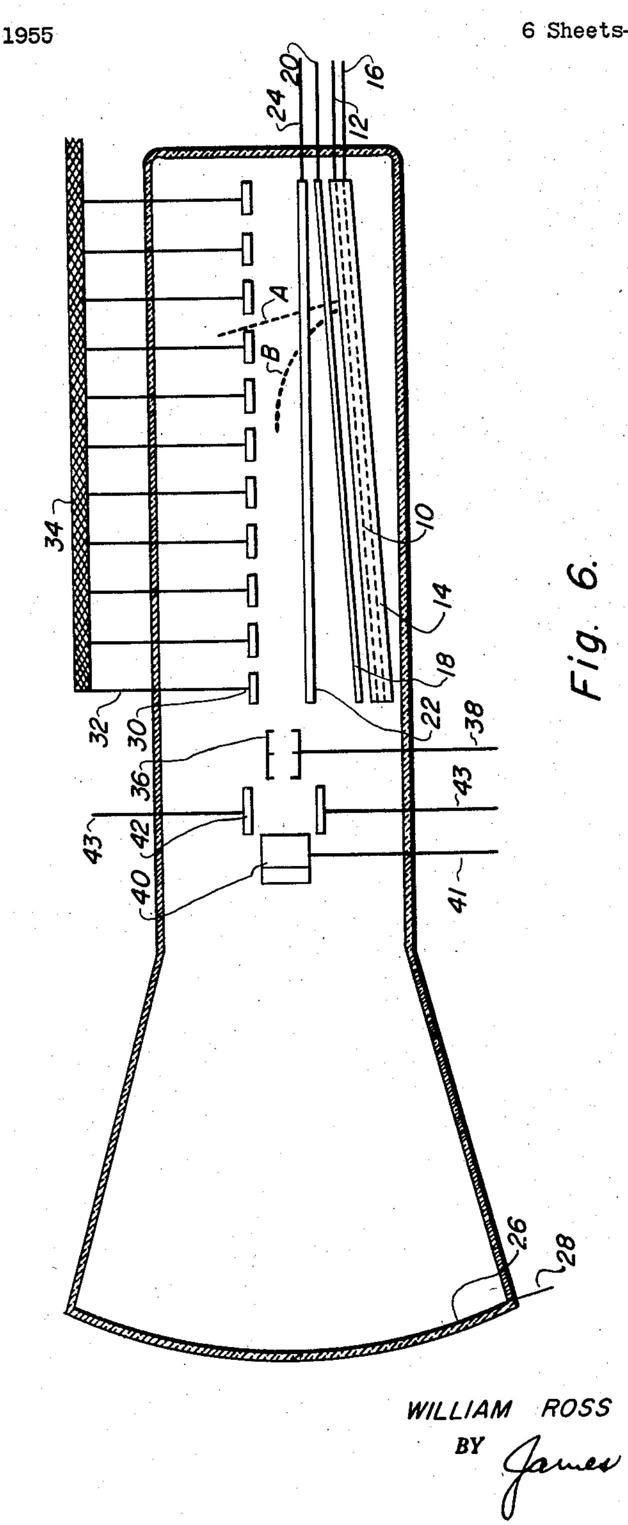
Figure 6 shows a modification of the apparatus shown in Figures 1 and 2.

Figure 6 shows another embodiment of the instant invention wherein a slotted electrode 22 coextensive with the set of deflection electrodes 30 is disposed intermediate the perforated accelerating electrode 18 and the deflection electrodes 30. The electrode 22 is provided with an electrical conductor 24 which suitably connects the electrode 22 to a suitable source of potential. It will be noted that in this embodiment the perforated electrode 18 carrying the desired symbols to be displayed, the cathode 10 and its associated beam forming electrode 14 are disposed at an angle with respect to the slotted electrode 22 and the set of deflection electrodes 30.

With the arrangement shown in Figure 6, the slotted electrode 22 is maintained at a voltage value which is lower than the voltage applied to the perforated accelerating electrode 18. The arrangement assists the deflection of the beam of electrons which pass through the electrode 18 and the slot or aperture formed through the entire length of the electrode 22.

There is also shown in diagrammatic form in connection with Figure 6, the relative paths of travel of the electrons when no deflecting forces are established by the deflection electrodes 30 and also the path of travel when a deflecting force is established by one of the deflection electrodes 30. The dotted line A indicated the path of travel of the electrons when no deflecting force is established by the deflection electrodes 30 and the dotted line B indicates the actual path of the electrons when a deflecting force is caused to be established by the deflection electrodes 30.

Figure 7:
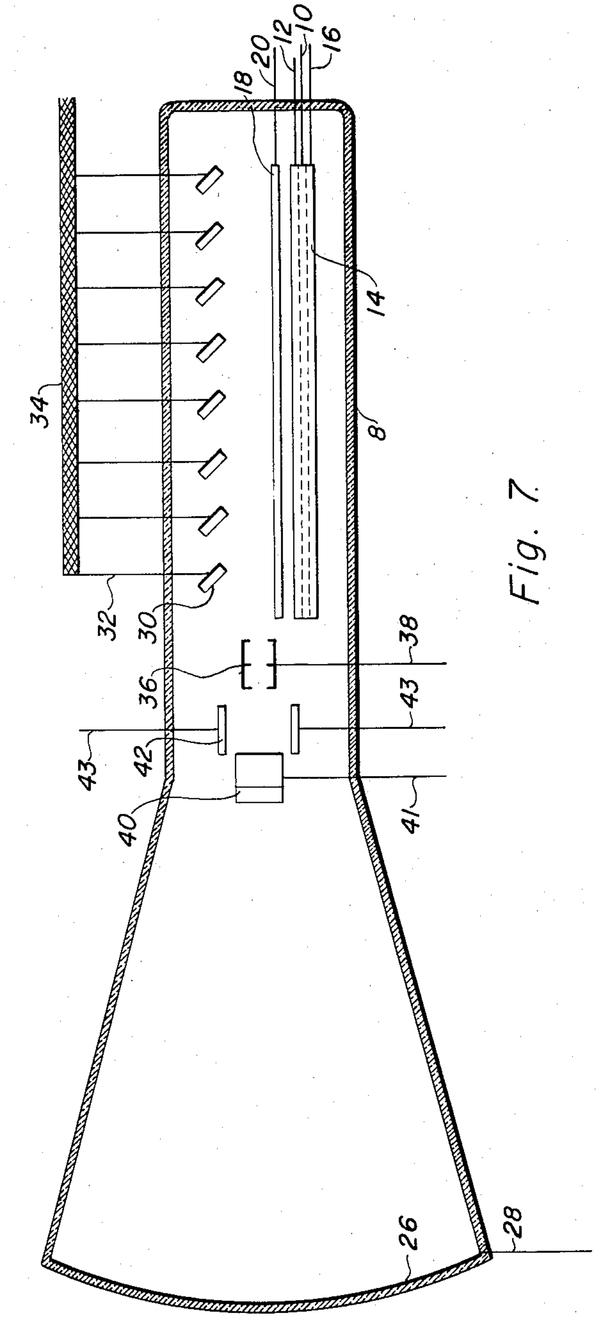
Figure 7 shows another modification of the apparatus shown in Figures 1 and 2.

Figure 7 illustrates another modification of the structure shown in Figures 1 and 2. It will be noted that the deflection electrodes 30 are tilted in such a manner that the surfaces thereof which are adjacent or in facing relation with the perforated electrode 18, the cathode 10, and the beam forming electrode 14 are tilted toward the target screen 26. By disposing the deflection electrodes 30 in this manner, in some applications electron beam deflection and bending may be achieved more readily.

Figure 9:
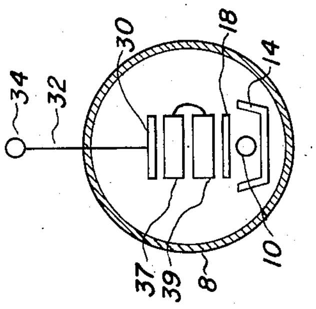
Figure 9 is a view of the cathode ray tube shown in Figure 8 taken along line 9—9.
Figure 8:
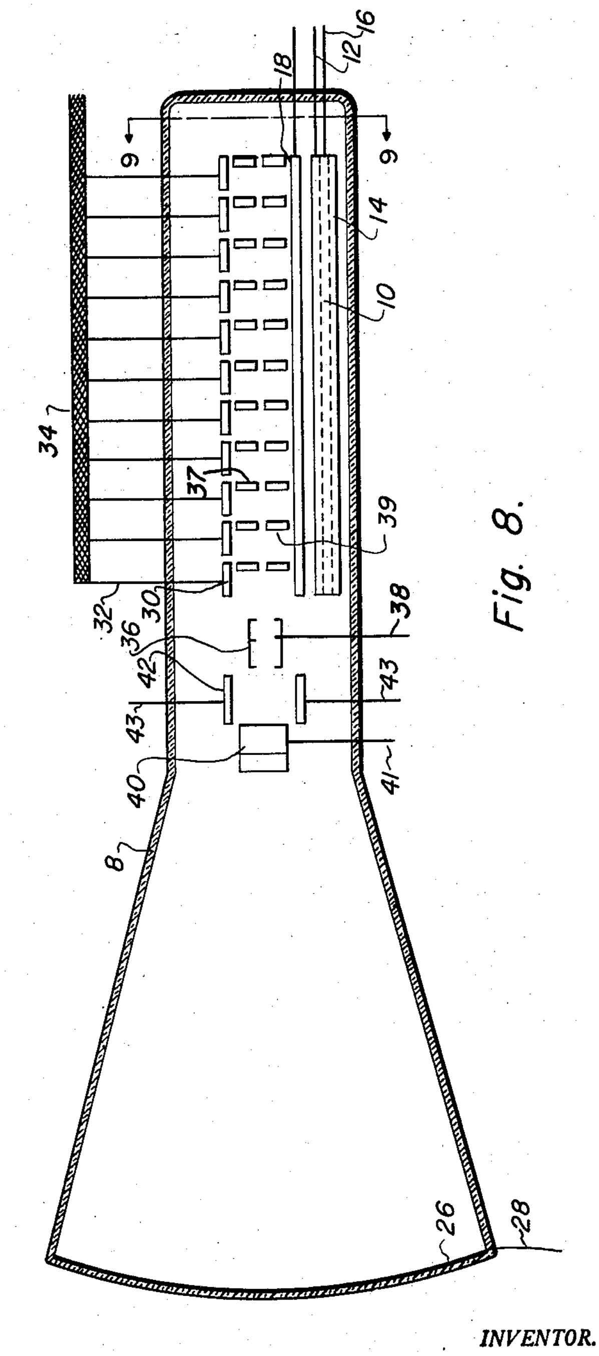
Figure 8 is a side view partially broken-away of a cathode ray tube employing the features of the instant invention showing a modification of the deflection electrodes shown in Figures 1 and 2.

Figures 8 and 9 illustrate another modification of the device directed to a modified version of the deflection electrodes. It will be noted that the deflection electrodes are constructed in three parts; the upper part 30 having a generally flat or planar top portion, another portion 37 depending downwardly therefrom and in spaced insulated relation thereto, and the lower part 39 is relatively flat and disposed in spaced insulated relation with respect to said other parts and to the perforated electrode 18. Further, it is to be pointed out that upper part 30 of each deflection electrode, shown in Figures 8 and 9, is electrically connected to a power supply through suitable conducting wires and that the two other parts 37 and 39 of each deflection electrode are connected together and to a power supply in such a way that portions 37 and 39 can be changed in voltage independently of part 30. The purpose for forming the electrodes in the manner shown is to achieve greater focusing of the electron beam after it has been deflected to travel toward the target.

In operation of the modification shown in Figures 8 and 9, the electron beam 15 is formed in the manner hereinabove set forth. The cathode 10 may be maintained at 0 volts potential; the beam forming electrode 14 at 5 volts potential negative with respect to the cathode 10; the apertured accelerator electrode at 500 volts potential positive with respect to the cathode 10; and the entire array of deflection electrodes at 500 volts potential positive with respect to the cathode 10. In the event that the portion of the beam 15 most remote from the target (the portion of the beam 15 at the far right in Figure 8) is to be deflected, the voltage on the last deflection electrode 30, at the far right in Figure 8, will be caused to be driven toward zero potential with respect to the cathode potential. The relatively negative electric field with respect to the beam 15 established by the deflection electrode part 30, which has been driven toward a zero potential value, will cause the beam 15 to be deflected toward the left. Now, in order to maintain focus of the formed electron beam 15 as it travels through the region between the individual parts of the electrodes, the potential on one of the electrode parts 37 and 39 spaced a distance of two electrodes in front of the deflected beam will be caused to be lowered to approximately 350 volts potential positive with respect to the cathode potential. It is deemed advantageous to so lower the voltage of the electrode parts 37 and 39 which are approximately two or three electrodes removed from the deflection electrode part 30 which actually established the electric field operative to bend the electron beam through substantially 90°. By so lowering the voltage, the deflected electron beam 15, upon penetrating the electric field established thereby, is accelerated and its focus is maintained. It will be manifest that the energization of the deflection electrodes, in the manner set forth above, may be readily affected by auxiliary apparatus.

Although it is deemed advisable to impress sixty-four symbols or characters on the apertured electrode 18, it is to be understood that any desired number, more or less, may be employed. However, it must be pointed out that for each character formed in the apertured electrode 18, it is generally necessary to employ at least one set of associated deflection electrodes. In the event that it is desired to display a group of symbols or characters on a target simultaneously, these symbols may be clustered together in the apertured electrode 18 in such a fashion that a single deflection electrode may be employed to deflect the electron beam passing therethrough simultaneously.

What is claimed is:

1. An electron discharge device comprising a target, an electron beam source means for delivering a sheet beam along a given path, means disposed adjacent and spaced from said source means for forming said beam into characters, and means for selectively deflecting said beam into impingement with said target subsequent to its passage through said forming means.

2. An electron discharge device comprising a target, an electron source means for delivering a sheet beam of electrons along a path in a direction which is substantially parallel to said target, a beam shaping member disposed across the path of said beam for simultaneously obtaining a series of shaped electron streams, and a set of deflection elements, each element being disposed relative to said electron beam to selectively deflect at least one of said streams from said path and into impingement with said target.

3. An electron discharge device comprising a target, an electron emitter source means for emitting a sheet beam of electrons along a path in a direction which is substantially parallel to said target, a beam shaping member extending substantially coextensively with said source means and disposed in the path of said beam whereby the electrons directed therethrough are formed into a series of shaped electron streams, a plurality of deflection members, each deflection member being preassigned for use in selecting an associated different one of the shaped streams, and means for energizing said deflection members selectively to effect deflection of the corresponding ones of said streams from said path and into registration with said target.

4. An electron discharge device as set forth in claim 3 which includes means for supporting each of said deflection members in offset relation relative to its associated electron stream, the deflection member being spaced slightly more distant from the target than its associated electron stream.

5. An electron discharge device as set forth in claim 3 which includes a plurality of focusing elements mounted between said deflection members and said source means, and in the path of the beam subsequent to its deflection by said deflection members in the direction of said target.

6. An electron discharge device comprising a target, an electron beam source means for delivering a sheet of electrons along a path in a direction which is substantially parallel to said target, character forming means disposed in said path to form a plurality of shaped electron beams, and means for applying deflecting forces to said shaped electron beams to selectively deflect different ones of said shaped electron beams toward said target.

7. An electron discharge device comprising a target, source means for delivering an electron beam along a path in a direction which is substantially parallel to said target, beam shaping means disposed in said path for shaping said electron beam into a plurality of different predetermined characters, and a plurality of deflection members disposed in the path of the shaped beam, each of which is operable to deflect the beam from said path in the direction of said target, different ones of said deflection members being operable to deflect different ones of the beam shapes toward said target.

8. An electron discharge device as set forth in claim 7 in which at least certain of said deflection members are supported in a common plane in the path of said beam, and said source means comprises an elongated cathode disposed in skewed relation relative to said common plane.

9. An electron discharge device as set forth in claim 7 in which each of said deflection members are disposed in skewed relation relative to the direction of initial travel of the beam to aid deflection of the beam in the direction of the target.

10. In an electron discharge device comprising a target, an electron source means for delivering a beam along a path in a direction which is substantially parallel to said target, beam shaping means disposed in the path of said beam for shaping said beam into different shaped symbols, a first deflection means comprising a plurality of deflection members located in the path of said beam as shaped, each of which is operable to selectively and individually deflect a different one of the beam shapes in the direction of said target, and a second deflection means for controlling the horizontal and vertical coordinate of registration of the selected one of the beam shapes with said target.

References Cited in the file of this patent

UNITED STATES PATENTS

| | | |
|---|---|---|
| 2,211,844 | Brett | Aug. 20, 1940 |
| 2,283,383 | McNaney | May 19, 1942 |
| 2,449,558 | Lanier et al. | Sept. 21, 1948 |
| 2,513,742 | Pinciroli | July 4, 1950 |
| 2,761,988 | McNaney | Sept. 4, 1956 |
| 2,795,729 | Gabor | June 11, 1957 |